March 12, 1935.   J. S. TOWNSEND   1,994,442
PAIL AND SPOUT
Filed April 25, 1932
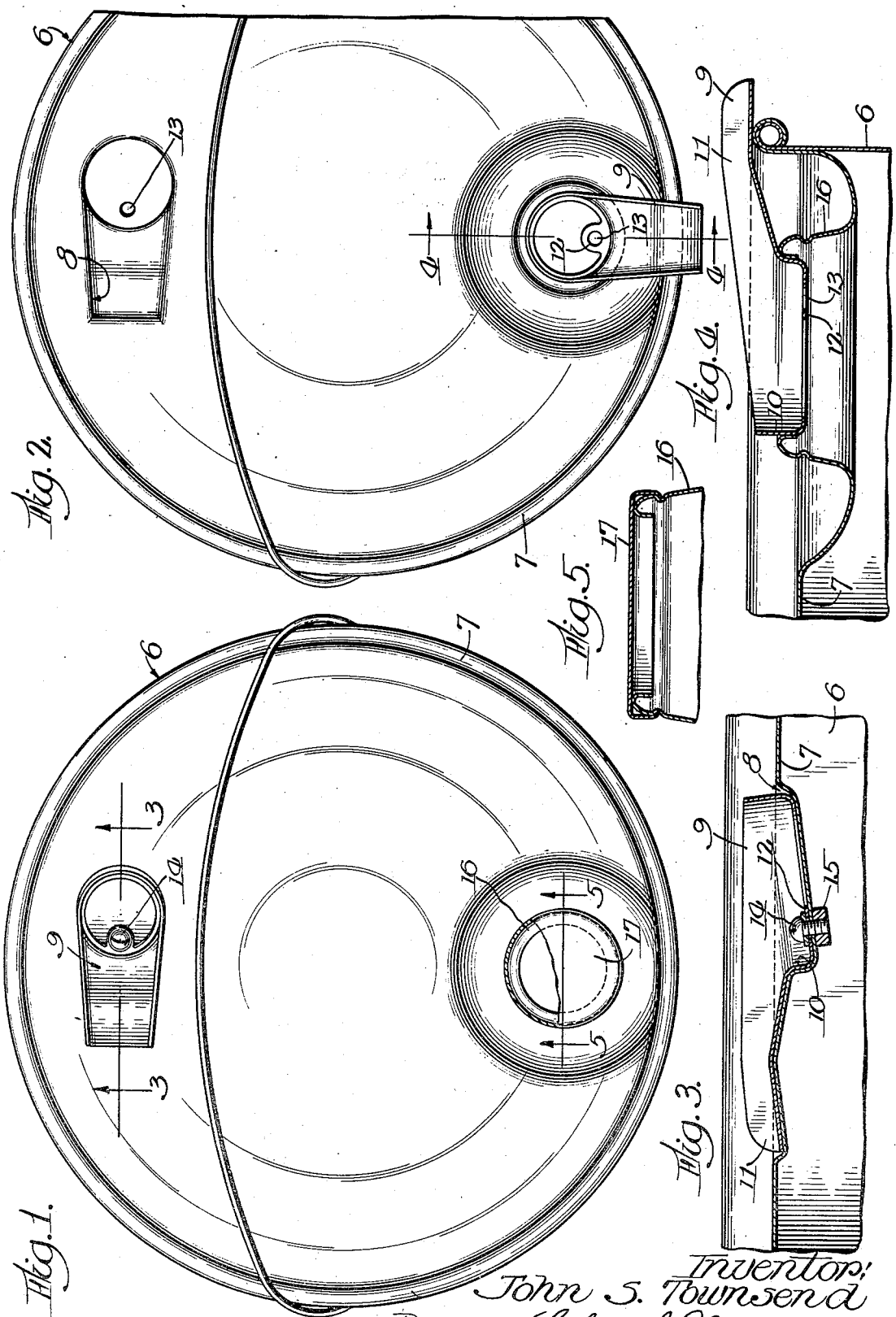
Inventor:
John S. Townsend
BY: Glenn S. Noble, Atty.

Patented Mar. 12, 1935

1,994,442

UNITED STATES PATENT OFFICE 1,994,442

PAIL AND SPOUT

John S. Townsend, Chicago, Ill., assignor to Wilson & Bennett Manufacturing Company, Chicago, Ill.

Application April 25, 1932, Serial No. 607,340

4 Claims. (Cl. 221—23)

This invention relates to pails, cans or containers for the shipment or storage of liquids such as oil or the like, and is particularly directed to the arrangement for conveniently pouring the contents out of the can or container. While various types of pouring spouts have heretofore been made, they have not been entirely satisfactory, and the present invention is intended to provide means of this character which will avoid the objectionable features of previous types of devices of this kind.

The objects of this invention are to provide an improved pail or container having a novel pouring device; to provide a pail with a detachable spout and means for supporting the spout on the head or cover of the pail; to provide a combined spout supporting means and vent for a container; to provide a pail or container having a recess or depression in the head or cover thereof for receiving a detachable spout with a spout fitting in such recess and held in position by a screw which also serves to close a vent hole; and to provide such other advantages and improvements as will appear more fully from the following description.

In the accompanying drawing, illustrating this invention,

Figure 1 is a top view of a pail or container embodying the same, with the pouring spout shown in shipping, or non-using condition;

Figure 2 is a similar view showing the pouring spout in using position;

Figure 3 is an enlarged sectional detail taken on the line 3—3 of Figure 1;

Figure 4 is a similar view taken on the line 4—4 of Figure 2; and

Figure 5 is a similar view taken on the line 5—5 of Figure 1.

The pail or container 6 is made of any suitable material such as sheet steel or the like, and is provided with a head or cover 7 which may be either fixed or removable in accordance with the present methods of manufacturing the same. The head 7 is provided with a recess 8 for receiving the pouring spout 9 when the latter is in non-using, or shipping position. The recess is preferably shaped to conform to the spout so that the latter will not turn therein, but is particularly made sufficiently deep so that the spout will not interfere with the stacking or nesting of the pails when they are placed one upon another.

The spout 9 comprises a circular or cylindrical portion 10 and a trough-like portion 11, as shown in the drawing. The lower end of the cylindrical portion is open throughout the major portion for the passage of the fluid but is provided with a lug or projection 12 having a hole 13 for receiving the fastening and vent screw or bolt 14 which passes through a hole in the head 7 and which engages with a nut 15 preferably secured to the inner side of the head as shown in Figure 3.

The head 7 has an outlet or nozzle 16 which is adapted to receive any suitable closure such as a cap 17 of the type commonly known as "U-pressit", as shown in Figure 5, which is used for shipping or storage. This nozzle is preferably arranged adjacent to one side of the pail as shown in Figure 4.

When the pail is filled, the spout is placed in position in the depression 8 and is fastened by the vent screw 14 so that it will be securely held in position for shipping and the nozzle is closed by the cap, 17.

When the customer or user receives the pail and desires to pour out the contents he first removes the cap 17 and then removes the screw 14 which releases the nozzle and at the same time provides a vent to permit air to enter the pail as the contents are poured out. The vent and depression are preferably arranged on the side of the pail opposite from the nozzle as shown in Figure 1. He then inserts the cylindrical portion of the pouring spout 9 in the nozzle as shown in Figure 4, with the trough like portion projecting out over the edge of the pail and preferably resting on the bead or rolled edge as indicated. The spout is held in position by friction which is sufficient for the purpose, although other fastening means (not shown) may be provided if desired. The contents may then be readily poured out through the nozzle without spilling and without leaking or drizzling over the surface or sides of the pail. Furthermore, when the pail is again tipped to upright position, any liquid remaining in the spout will drain back through the nozzle into the can, which is a very important feature, particularly when such cans are used for oils or the like. If only a portion of the contents is to be removed, the parts may be again returned to initial position for storage, and for protecting the contents.

While I have shown a commercial form of my device, it will be noted that changes may be made in the form of the same, and in the details of construction without departing from the scope of this invention and therefore, I do not wish to be limited to the precise form illustrated, except as set forth in the following claims, in which I claim.

1. A pail or container having a vent opening provided with a closing member, and a detachable spout held in position by said closing member.

2. The combination with a pail having a vent screw in the head thereof, of a spout adapted to be secured to the head by said screw.

3. A pail or container having a head provided with a nozzle adjacent to one side thereof and having a recess at the opposite side thereof with a vent opening therein, a screw for closing said opening, a pouring spout adapted to engage with the recess and be held in position by said screw, said spout also being adapted to engage with the nozzle and to extend over the side of the pail when in pouring position..

4. A pail or container having a vent screw in the cover thereof adjacent to one side and having a recess around the vent opening, said cover also having a nozzle spaced from the vent screw, a closure for said nozzle, and a pouring spout adapted to engage with said recess and be held in position by said vent screw, the arrangement being such that the spout will permit the nesting of the containers, said spout also being adapted to engage with the nozzle and to project over the side of the container when in pouring position.

JOHN S. TOWNSEND.